United States Patent Office 3,436,385
Patented Apr. 1, 1969

3,436,385
METHOD OF POLYMERIZING VINYL CHLORIDE
Alexis Mathieu, Brussels, Belgium, assignor to Solvay & Cie, Brussels, Belgium, a Belgian corporation
No Drawing. Filed Sept. 9, 1966, Ser. No. 578,145
Claims priority, application Belgium, Sept. 30, 1965, 670,326
Int. Cl. C08f 1/11
U.S. Cl. 260—92.8        3 Claims

ABSTRACT OF THE DISCLOSURE

A vinyl chloride polymer is obtained in the form of highly porous granules by polymerizing vinyl chloride in an aqueous medium containing a dispersing agent which is a copolymer of vinyl pyrrolidone and alkyl acrylate.

---

This invention relates to a method of polymerizing vinyl chloride to obtain granules of vinyl chloride polymer which are highly porous.

For many uses, vinyl chloride polymers must be plasticized before being used. Accordingly, it is necessary that the polymers be able to absorb plasticizers in proportions which are sometimes high.

Vinyl chloride polymers are frequently made by polymerizing vinyl chloride in an aqueous medium containing a polymerization catalyst, in which medium the vinyl chloride is suspended. The polymer is obtained in a subdivided form generally characterized as "granular" or "particulate." It is recognized that the amount of plasticizer which these grains or particles can absorb is proportional to the porosity of the grains or particles. In order that the polymer rapidly absorb a considerable quantity of plasticizer, it is necessary that the grains or particles be sufficiently porous.

When an aqueous suspension of vinyl chloride containing conventional dispersing, i.e., suspension-forming, agent is polymerized under suitable conditions for the polymerization, it is not possible to obtain the polymer in the form of grains or particles which are highly porous.

Moreover, certain dispersing agents result in excessive crusting or caking of the polymer and can even render the entire yield of polymer into a crusted or caked mass. Also, certain other dispersing agents discolor the polymer or render the polymer thermally unstable.

Finally, there are numerous conventional dispersing agents, such as polyvinyl alcohol and polymers of vinyl pyrrolidone including copolymers of pyrrolidone with vinyl acetate or acrylamide, the use of which dispersing agents results in polymers which are in the form of compact grains or particles having insufficient porosity to rapidly absorb sufficient plasticizer for certain uses of the polymer.

According to the present invention, it has been found that in the polymerizing of vinyl chloride in an aqueous medium wherein the vinyl chloride is suspended, the use of certain copolymers as dispersing agents in the aqueous medium results in polymer in the form of grains or particles which are highly porous. In particular, the dispersing agents of the present invention are copolymers of 70 to 95%, by weight, of vinyl pyrrolidone and the balance, i.e., 30 to 5%, by weight, of an alkyl acrylate the alkyl substituent of which contains at least six carbon atoms.

With respect to the dispersing agents of the present invention, it is found that if the alkyl group of the alkyl acrylate contains less than six carbon atoms, the porosity of the grains or particles of the vinyl chloride polymer is not sufficient to provide adequate absorption or plasticizer for many uses of the polymer. Optimum results are attained if the alkyl group of the alkyl acrylate contains at least eight carbon atoms. The alkyl group of the alkyl acrylate may contain as many as 18 carbon atoms.

The amount of the dispersing agent is not at all critical and amounts like those of conventional dispersing agents may be used.

In accordance with conventional practice, the aqueous medium containing monomer and the dispersing agent will also generally contain an addition polymerization initiator, generally referred to as a polymerization "catalyst." Typical of these polymerization catalysts are organic peroxides such as benzoyl peroxide and lauroyl peroxide and aliphatic azobisnitriles such as azobis-isobutyronitrile. The polymerization catalyst and the amount thereof used are conventional and do not constitute the present invention.

Vinyl chloride polymer made by the polymerization of vinyl chloride in an aqueous medium containing the dispersing agent of the present invention constitutes highly porous grains which rapidly absorb a considerable quantity of plasticizer and, accordingly, readily form dry mixtures with plasticizers, which mixtures have excellent pourability and therefore can be handled easily. Furthermore, plasticized polymer of the present invention is very homogeneous and is readily fabricated by conventional techniques into such products as film free from major defects such as "fish eyes."

The more porous the grains of polymer, the greater will be the quantity of plasticizer absorbed thereby, which quantity is conveniently expressed as grams of plasticizer absorbed per 100 grams of polymer. Plasticizer is considered to be absorbed by the polymer if it does not separate from admixture with the polymer upon subjection of the mixture to mechanical treatment. To determine the quantity of plasticizer absorbed, the following procedure is employed.

PROCEDURE FOR DETERMINING THE QUANTITY OF PLASTICIZER ABSORBED BY POLYMER

About two parts of plasticizer per part of the polymer is mixed with the polymer until a homogeneous mixture is formed. Excess, i.e., unabsorbed, plasticizer is removed from the mixture by a mechanical treatment constituting centrifugation of the mixture for a period of five minutes at an acceleration of 100 gravities. The plasticized polymer remaining is weighed and thereby the quantity of plasticizer absorbed is determined.

The invention will now be further described by reference to examples. Examples I and II are not according to the invention but rather for comparison with the invention. Examples III to V are according to the invention.

EXAMPLES FOR COMPARISON

Example I

A 5 liter autoclave is charged with 2,800 grams of distilled water, 3 grams of polyvinyl alcohol (dispersing agent) and 2 grams of lauroyl peroxide (polymerization catalyst). Air is then evacuated from the autoclave. 1,500 grams of vinyl chloride is charged into the evacuated autoclave. The charge is stirred at a constant speed and the temperature thereof increases to 60° C. The polymerization is continued at this temperature for 9 hours, at which time the conversion of vinyl chloride into polyvinyl chloride is about 90%. The polymer is filtered from the reaction mixture, washed with water and dried in a drying oven at 65° C. up to the point of constant weight. The polymer has a porosity such that it absorbs 15 grams of dioctyl phthalate (plasticizer) per 100 grams of the polymer.

Example II

The same polymerization, filtering, washing and drying as in Example I is carried out except that the 3 grams of polyvinyl alcohol is replaced by 3 grams of a copolymer constituted of 90% by weight of vinyl pyrrolidone and 10% by weight of methyl acrylate. The polymer obtained has a porosity such that it absorbs 12.5 grams of dioctyl phthalate per 100 grams of the polymer.

EXAMPLES ACCORDING TO THE INVENTION

Example III

The same polymerization, filtering, washing and drying as in Example I is carried out except that the 3 grams of polyvinyl alcohol is replaced by 3 grams of a copolymer constituted of 90% by weight of vinyl pyrrolidone and 10% by weight of 2-ethylhexyl acrylate. The polymer obtained has a porosity such that it absorbs 22 grams of dioctyl phthalate per 100 grams of the polymer.

Example IV

The same polymerization, filtering, washing and drying as in Example I is carried out except that the 3 grams of polyvinyl alcohol is replaced by 3 grams of a copolymer constituted of 80% by weight of vinyl pyrrolidone and 20% by weight of lauroyl acrylate. The polymer obtained has a porosity such that it absorbs 28 grams of dioctyl phthalate per 100 grams of the polymer.

Example V

The same polymerization, filtering, washing and drying as in Example I is carried out except that the 3 grams of polyvinyl alcohol is replaced by 3 grams of a copolymer constituted of 80% by weight of vinyl pyrrolidone and 20% by weight of stearyl acrylate. The polymer obtained has a porosity such that it absorbs 27 grams of dioctyl phthalate per 100 grams of the polymer.

The invention is not to be construed as limited to the particular embodiments disclosed herein, since these are to be regarded as illustrative rather than restrictive.

What I claim and desire to secure by Letters Patent is:

1. In the method of polymerizing vinyl chloride in an aqueous medium, the improvement comprising forming a suspension of the vinyl chloride in the aqueous medium by adding to the aqueous medium in an amount effective to act as a dispersing agent a copolymer of 70 to 95%, by weight, of vinyl pyrrolidone and 30 to 5%, by weight, of an alkyl acrylate the alkyl group of which contains at least 6 carbon atoms.

2. In the method according to claim 1, in which the alkyl group contains at least 8 carbon atoms.

3. In the method according to claim 1, in which the alkyl group contains up to 18 carbon atoms.

References Cited

UNITED STATES PATENTS

| | | |
|---|---|---|
| 3,042,665 | 7/1962 | Jankowiak et al. |
| 3,049,520 | 8/1962 | Gatta et al. |
| 3,062,759 | 11/1962 | Bingham et al. |

JAMES A. SEIDLECK, *Primary Examiner.*

JOHN A. DONAHUE, JR., *Assistant Examiner.*

U.S. Cl. X.R.

260—31.8, 86.1